Figure 1:
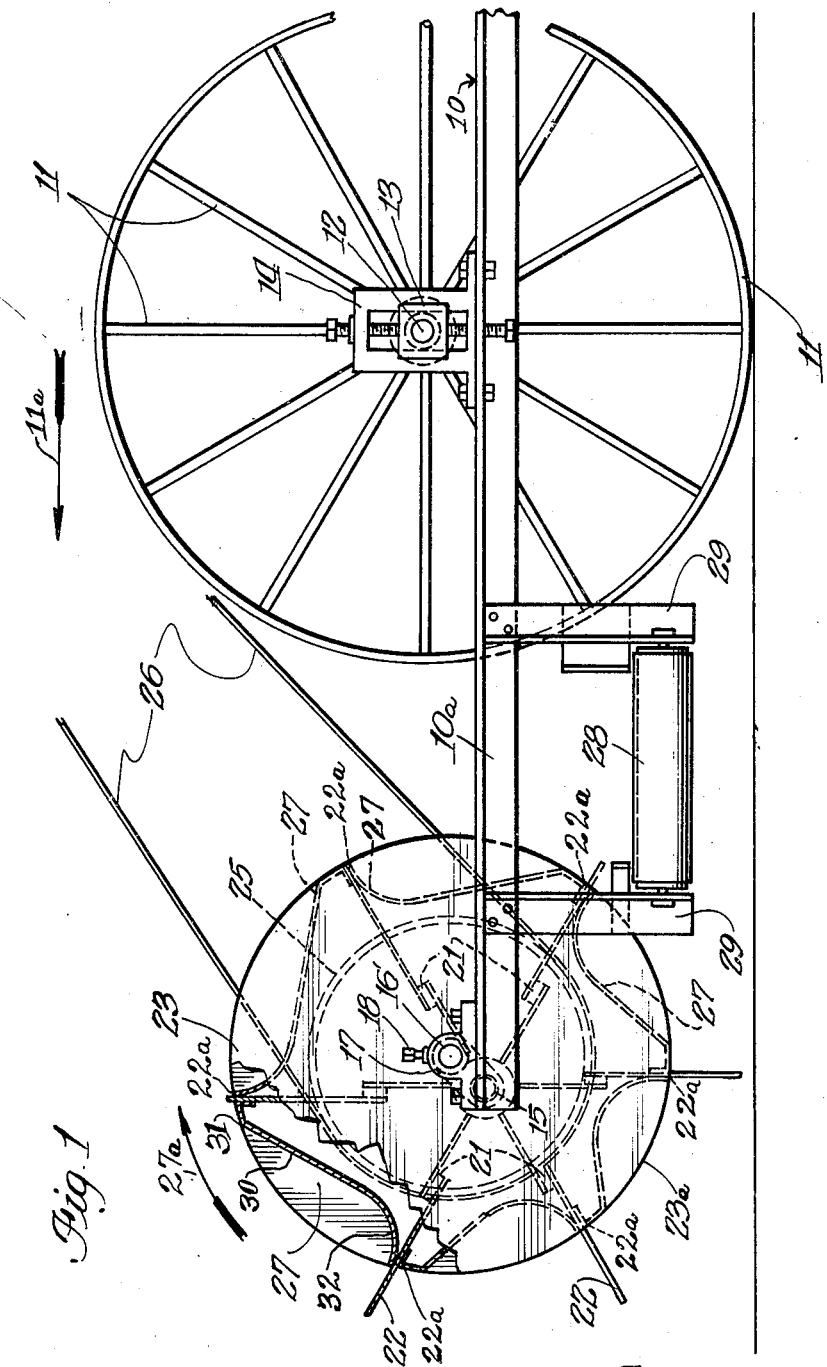

May 23, 1950 T. E. KIRK 2,508,401
MOVING COMB TYPE SEED GATHERER
Filed Aug. 22, 1945 3 Sheets-Sheet 1

INVENTOR.
Thomas E. Kirk.
BY Brayton Richards
Attorney.

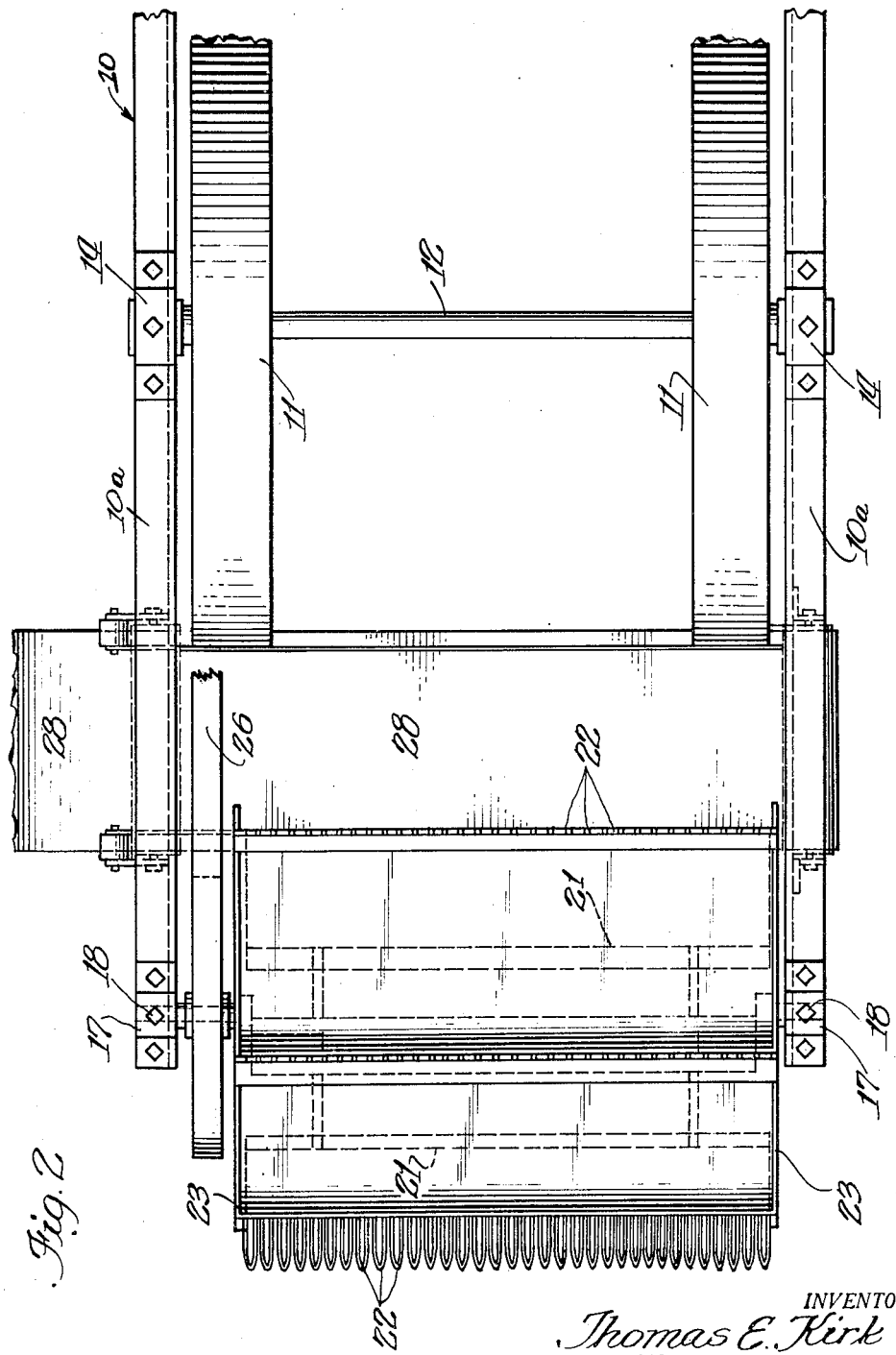

May 23, 1950 T. E. KIRK 2,508,401
MOVING COMB TYPE SEED GATHERER
Filed Aug. 22, 1945 3 Sheets-Sheet 3
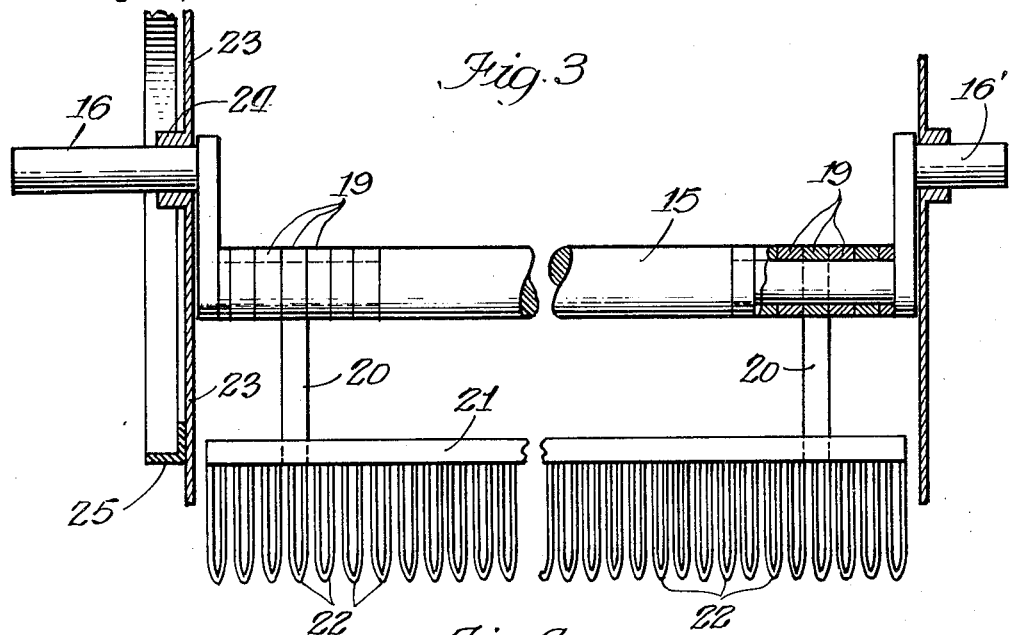
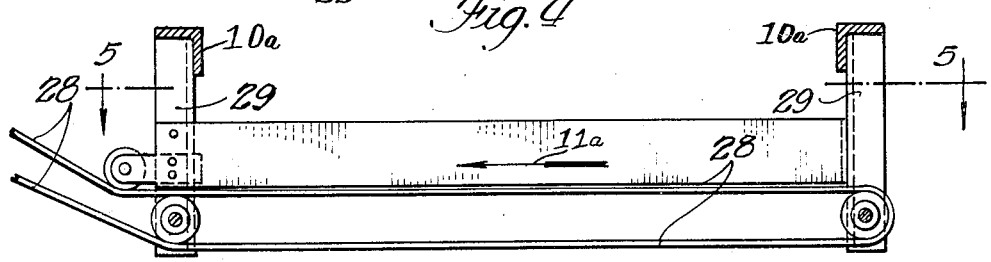
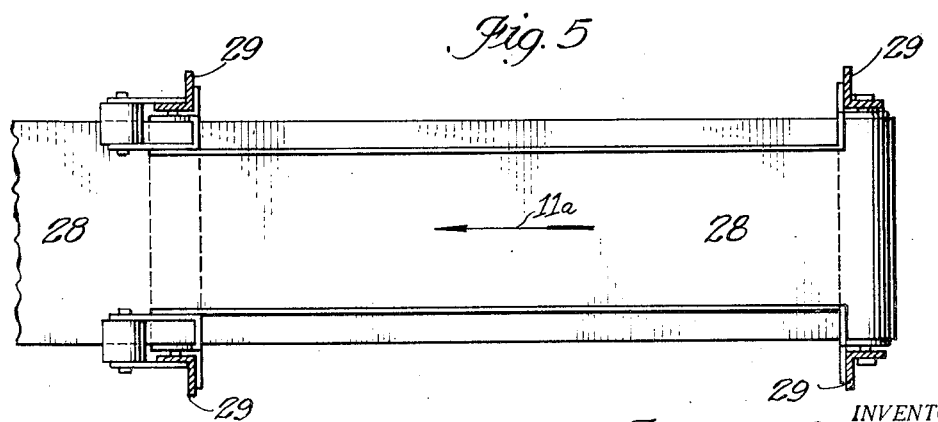
Thomas E. Kirk, INVENTOR.
BY Brayton Richards, Attorney.

Patented May 23, 1950

2,508,401

UNITED STATES PATENT OFFICE 2,508,401

MOVING COMB TYPE SEED GATHERER

Thomas E. Kirk, Waitsburg, Wash.

Application August 22, 1945, Serial No. 612,100

3 Claims. (Cl. 56—130)

The invention relates to improvements in harvesting machines especially adapted for harvesting or picking objects such as pea pods or the like, which is of simple construction and highly efficient in use.

Other objects will appear hereinafter.

The invention consists of the combinations and arrangements of parts hereinafter described and claimed.

The invention will be best understood by reference to the accompanying drawings forming a part of this specification and in which:

Fig. 1 is a partial side view, shown partially in section, of a harvesting machine embodying the invention;

Fig. 2, a partial top plan view of the same;

Fig. 3, a partial longitudinal horizontal section taken through a harvesting member employed in the construction;

Fig. 4, a side view of a conveyor employed in the construction; and

Fig. 5, a horizontal section taken substantially on the line 5—5 of Fig. 4.

The embodiment of the invention illustrated in the drawings comprises a vehicle body or frame 10 mounted to travel upon suitable wheels 11, said wheels being carried by an axle 12 having bearings at each end in blocks 13, which are vertically adjustable in brackets 14 secured to the side bars of the body 10, as best illustrated in Fig. 1. As will be readily understood, this mounting of the wheels 11 permits of vertical adjustments of the vehicle body 10 with reference to the ground over which the vehicle is propelled in the harvesting operation.

The frame member 10 comprises a pair of sill members 10a arranged in spaced and parallel relation and supported by an axle shaft 12 adjacent its rearward end which is carried by a pair of tread wheels 11 arranged between said sill members 10a, as best shown in Figure 2. At the forward end of the frame 10 a rotatable harvesting member having bearing hubs 24 moveably mounted in desired position in the boxes or bearings 17 and held in set position by set screws 18. The boxes or bearings 17 are rigidly attached to the forwardly ends of the sill members 10a and serve to hold the frame 10 in operational alignment for the rotation of the harvesting member 23. The periphery 23a of the rotatable harvesting member 23 is provided with a plurality of pocket plates 30 arranged in spaced relation leaving transverse slots 22a through which the fingers 22 carried by the picker bars 21 are adapted to reciprocate, as best shown in Figure 1.

The direction of rotation of the rotatable harvesting member 23 in connection with the cam member 15 carried on the trunnions 16 and 16' within the said member 23 advances the finger 22 to progressively project into picking position and then to be progressively retracted allowing the pods gathered to drop onto the belt 28, operation means of which is not shown, and may be operated by such means as are convenient and practical, which is likewise true as to the operation of the transmission belt 26 which drives the fixed pulley 25.

The pocket plates 30 have an S-shaped profile, as best shown in Figure 1, and are arranged in spaced relation to the one next adjoining at the periphery 23a, the intervening space being the transverse opening 22a. It is to be noted that the upper part of the S-shaped pocket plate 30 is bent into radial alignment forming a flange 31 upon which the fingers 22 are slidably arranged and that the lower part of the S-shaped pocket plate 30 serves as a curved guide 32 for the upper side of the fingers 22.

A cam member 15 in the form of a stud shaft is provided, as best shown in Figs. 1 and 3, with eccentric trunnions 16 and 16' which are mounted in boxes or bearings 17 at each side of the body 10 and adjustably secured in said bearings by means of set screws 18. A plurality of pairs of rings or hubs 19 are rotatably mounted on the member 15 and carry radiating arms 20 which in turn carry picker bars 21 arranged as indicated around said member 15, as best shown in Figs. 1 and 3, there being six of the picker bars 21. Each picker bar 21 carries a plurality of parallel closely spaced picker fingers 22 arranged to reciprocate inwardly and outwardly through transverse slots 22a in the periphery 23a of the rotatable harvesting member 23, said harvesting member 23 being provided with bearing hubs 24 at each end, which rotate freely on the trunnions 16 and 16', as best indicated in Fig. 3. A driving pulley 25 is secured to one end of the member 23, and a belt 26 mounted on the fixed pulley 25 connected therewith for rotating the member 23 in the direction of the arrow 27a indicated in Fig. 1. A series of pockets 27 are provided in the periphery of the member 23 between the sets of fingers 22, as indicated. In operation, the vehicle 10 is moved in the direction of the arrow 11a on Fig. 1 over a field to be harvested, such as a field of peas or the like. This will cause the fingers 22 to move forwardly and upwardly through the pea vines and will thereby strip the pea pods from the vines and deposit them in the pockets 27. When the fingers 22 reach their upper positions, they will be automatically withdrawn through the slots in the periphery of the member 23 to strip the pea pods therefrom and permit discharge of said pods from the pockets 27 as said pockets pass over the center and downwardly on the inner or rear side of the member 23.

A conveyor 28 is arranged as shown on hangers 29, depending from the body 10, to receive the pods thus discharged from the pockets 27. As shown, the conveyor 28 extends laterally across the body 10 and then upwardly and outwardly so as to discharge the harvested pods into a truck or other receptacle, as will be readily understood.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

I claim:

1. In combination, a harvesting machine having a vehicle body frame and axle mounted supporting wheels with vertical adjustment for said axle; and a cylindrical rotatable member mounted transversely at the forward end of said frame; a peripheral wall on said cylindrical rotatable member having inwardly extending curved plates forming a plurality of peripheral pockets; there being a longitudinal slot between each of said pockets; a cam member in the form of a stud shaft having eccentric trunnion members mounted in a bearing at each side of said body frame; a plurality of pairs of hubs rotatably mounted one of each pair on each stud shaft; a pair of radial arms each connected at their inner ends to a member of a selected pair of hubs and extending forwardly therefrom; a picker bar connected to both forward ends of said pair of said radial arms; a plurality of forwardly projecting picking fingers in spaced and parallel relation arranged and adapted to reciprocate inwardly and outwardly through a selected one of said longitudinal slots upon the rotation of said cylindrical member.

2. The construction specified in claim 1 in which the picking fingers have parallel side edges, there being a plurality of elongated slots between the plurality of picking fingers carried by said picker bar.

3. A pod picking harvesting device comprising a supporting vehicle; a cylindrical rotatable member having a plurality of evenly spaced longitudinal slots in the peripheral wall; cam means for reciprocating a plurality of picking fingers inwardly and outwardly through said longitudinal slots to strip pods from a growing plant; and container means arranged within the said peripheral wall to capture pods stripped from the growing plants.

THOMAS E. KIRK.

REFERENCES CITED

The following references are of record in the file of this patent:

UNITED STATES PATENTS

| Number | Name | Date |
| --- | --- | --- |
| Re. 2,192 | Craven et al. | Mar. 13, 1866 |
| 319,257 | Hunt | June 2, 1885 |
| 1,426,691 | Videtto | Aug. 22, 1922 |
| 2,133,143 | Innes | Oct. 11, 1938 |
| 2,165,088 | Anderson | July 4, 1939 |